United States Patent
Roderweiss et al.

[11] Patent Number: 5,816,229
[45] Date of Patent: *Oct. 6, 1998

[54] INTERNAL COMBUSTION ENGINE WITH HEMI-SPHERICAL CYLINDER HEAD AND MATCHED RADIUSED PISTON

[75] Inventors: Ronald W. Roderweiss, Oak Park; Frederick P. Hall, Orland Park, both of Ill.

[73] Assignee: HD Performance Products Inc., Cicero, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 594,886

[22] Filed: Feb. 9, 1996

[51] Int. Cl.[6] ................................................ F02B 23/08
[52] U.S. Cl. ......................................... 123/671; 123/193.6
[58] Field of Search ............................. 123/193.1, 193.6, 123/671.662

[56] References Cited

U.S. PATENT DOCUMENTS

| | | |
|---|---|---|
| 4,111,104 | 9/1978 | Davison, Jr. . |
| 4,114,518 | 9/1978 | Glover et al. .......................... 123/193.6 |
| 4,245,611 | 1/1981 | MItchell et al. . |
| 4,342,291 | 8/1982 | Lewis . |
| 5,285,755 | 2/1994 | Reguiro ................................ 123/193.6 |
| 5,309,879 | 5/1994 | Reguiro ................................ 123/193.6 |
| 5,390,634 | 2/1995 | Walters et al. .......................... 123/671 |

*Primary Examiner*—Marguerite McMahon
*Attorney, Agent, or Firm*—Banner & Witcoff Ltd

[57] ABSTRACT

An internal combustion engine having a piston is disclosed. The piston has a circular flat piston heat portion extending normal to the piston axis and opposed depressions opposite the combustion chamber intake and exhaust openings, respectively. The circular flat piston head portion includes a beveled rim with a radiused profile, the piston head having a circular edge and the cylinder head has a circular circumferential edge which matches the circular edge of the piston to define a uniform quench area upon the compression stroke of the piston.

8 Claims, 3 Drawing Sheets

INTERNAL COMBUSTION ENGINE WITH HEMI-SPHERICAL CYLINDER HEAD AND MATCHED RADIUSED PISTON

BACKGROUND OF THE INVENTION

1. Field of the Invention

The invention relates to an internal combustion engine wherein combustion of a fluid mixture in a chamber is initiated to develop power to move a piston during a power stroke of a four stroke cycle of operation.

2. Description of the Prior Art

The conventional internal combustion engine for an automobile or motorcycle utilizes pistons inside cylinders operating in a four stroke cycle. The pistons are joined to a common crankshaft by connecting rods so that the pistons travel back and forth in the cylinders in a reciprocating action as the crankshaft rotates. In the four stroke cycle engine, there is usually an exhaust valve and an intake valve for each cylinder. The valves are operated by a cam shaft that is geared or otherwise connected to rotate at a fixed speed with respect to that of the crankshaft. The four strokes of each cycle of operation of the internal combustion engine are the intake, compression, power and exhaust strokes. The fluid mixture of air and gasoline is drawn into each cylinder during the intake stroke, compressed during the compression stroke, ignited at the beginning of the power stroke to expand and move the piston during the power stroke, and then the burned fluid mixture is expelled during the exhaust stroke.

In order to increase horsepower, more gas and air must be placed in the cylinder so there is greater combustion. With greater combustion, there must be uniform burning of the gas and air mixture. Various designs of cylinder heads and pistons, including elaborate designs in the dome of the piston have been developed in the last 40 to 50 years. In the late 1940's and early 1950's, a spherical cylinder head was developed. The spherical head totally unshrouds the intake valve which allows the cylinder head to breath better, or allow more air into this combustion space defined by the piston dome and cylinder head. The spherical cylinder head became known as the hemi-head because it resembles a half sphere. At low engine rpm, the hemi-head was not an efficient motor because it did not have a well-defined quench. The quench area is the space between the outside circumference of the piston head and the cylinder head. It is this area that causes the air and gas to be squeezed which creates a turbulence in the space between the piston head and cylinder head that assists in the mixing of the gas and air.

The hemi-head cylinder head became less attractive because the combustion chamber, being smaller, increases the quench area, however, at the same time, it shrouded the valves which inhibited the breathing. There is a need for an improved piston and cylinder head in which an outside circumference of the piston matches the circumference of the cylinder head to provide the quench to better mix the gas and air resulting in more complete combustion or a rapid burning of the gas and air and increased horsepower.

BRIEF SUMMARY OF THE INVENTION

The internal combustion engine of this invention develops increased horsepower over conventional engines. The increased horsepower is due to the matching of the piston head with the cylinder head in such a manner to produce an even, uninterrupted flame travel across the top of the piston, and more efficient combustion resulting in more horsepower and a cleaner burning engine.

In order to effectively develop the increased horsepower, the present invention utilizes a piston head with a substantially flat dome, including a circumferential edge or radius and a spherical cylinder head having a circumferential edge which generally matches the circumferential edge or radius of the piston thereby defining a uniform quench area which increases the turbulence of the air and gas mixture to create more complete combustion resulting in increased horsepower.

It is, therefore, an object of this invention to provide an internal combustion engine of the reciprocating piston type wherein it has a flat dome.

It is another object of the invention to provide an internal combustion engine of the reciprocating piston type wherein a flat piston dome raised to a height to substantially equal the thickness of the head gasket.

It is another object of this invention to provide an internal combustion engine of the reciprocating piston type that has a hemi-spherical cylinder head.

It is another object of the invention to provide an internal combustion engine of the reciprocating piston type that allows maximum air and gas mixture flow into the combustion chamber because the intake valve in the chamber is unshrouded.

Still another object of this invention is to provide an internal combustion engine of the reciprocating piston type wherein the combustible air and gas mixture is more completely and evenly burned during its operation to increase horsepower of the engine.

It is another object of this invention to provide an internal combustion engine of the reciprocating engine type wherein the radiused circumferential edge of the piston is on the same plane of the radiused circumferential edge of the cylinder head when the piston is at the top dead center position.

A further object of this invention is to provide an internal combustion engine of the reciprocating piston type with a piston having a circumferential edge and a hemi-spherical cylinder head with a circumferential edge that matches the circumferential edge of the piston so that the piston head may, in its stroke cycle, travel close to the cylinder head to define a better quench area.

Another object of this invention is to provide an internal combustion engine of the reciprocating type wherein an enlarged quench area is defined by the width, circumference and height of the radius of the circumferential edge of the piston.

The novel features which are believed to be characteristic of the invention, both as to its organization and method of operation, together with further objects and advantages thereof, will be better understood from the following description considered with the accompanying drawings in which an embodiment of the invention is illustrated by way of example. It is to be expressly understood, however, that the drawings are for the purpose of illustration and description only, and are not intended as a definition of the limits of the invention.

DESCRIPTION OF THE PREFERRED EMBODIMENT

Figure 1:
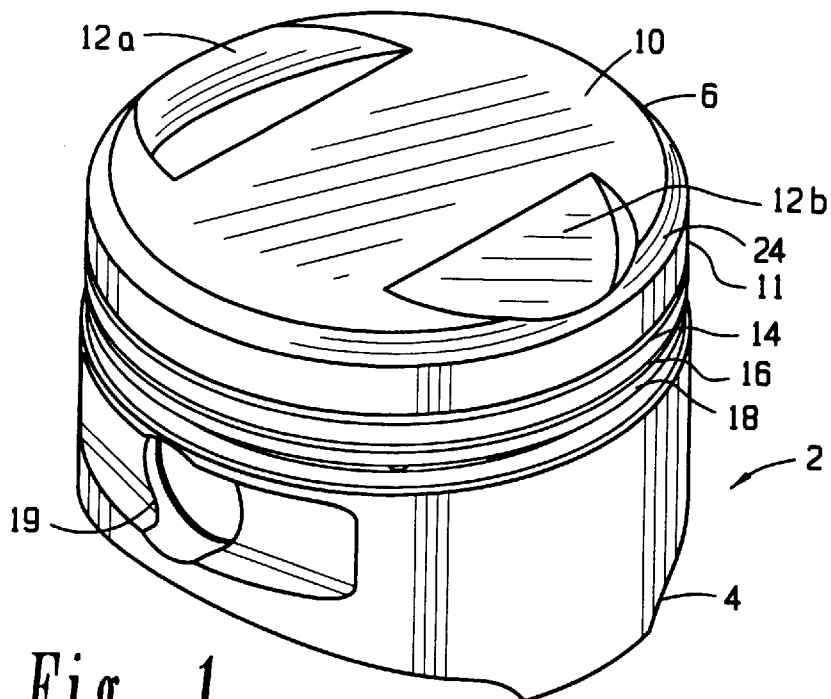
FIG. 1 is a perspective view of a piston head of this invention.

Referring now to the drawings, there is illustrated in FIG. 1 a perspective view of a piston head of this invention. The piston 2 includes a cylindrical body portion 4 which is arranged within a cylinder of a four-stroke internal combustion engine which is not shown. The internal combustion engine must have at least one cylinder. Head portion 6 extends into the combustion chamber 8 of the engine as shown in FIGS. 2–4b when the piston is in its top dead center position.

The head portion 6 of the piston has a flat dome 10 which enables an uninterrupted flame path to travel across the head to ignite the gas in the air and gas mixture. On either side of the surface of the flat dome is a depression 12a and 12b which serve as valve pockets. Valve pocket 12a is relatively large so the intake valve does not strike the flat dome 10. Valve pocket 12b is positioned so that the exhaust valve does not strike the flat dome 10. Compression rings 14 and 16 seal the piston in the cylinder 21 in the block of the internal combustion engine. Control ring 18 seals engine lubricant from flowing upwardly onto head portion 6. Wrist pin boss or aperture 19 is utilized for holding a bolt, not shown, for connecting the piston 2 with a piston rod, not shown, within the cylinder 21. The generally cylindrical piston 2 reciprocates above its longitudinal axis relative to combustion chamber 8. Quench area 20 is the space between hemi-spherical cylinder head 22, circumferential edge 24 around the head portion 6 of the piston, circumferential edge 26 of hemi-spherical cylinder head 22 when piston 4 is on the compression stroke within cylinder 21. In conventional internal combustion engines, the quench area is defined by a ledge projecting beyond the combustion chamber. In operation, as the piston ascends and approaches the ledge, a rapid squeezing action or squish is applied to the air-filled mixture contained in the combustion chamber or the area immediately between the piston dome and the ledge. The squeezing action forces the entrapped mixture rapidly into the combustion chamber, creating greater mixture turbulence. In conventional engines, if the quench area clearance is increased, a loss of power will occur. If the quench area is too small, detonation will occur.

Figure 3A:
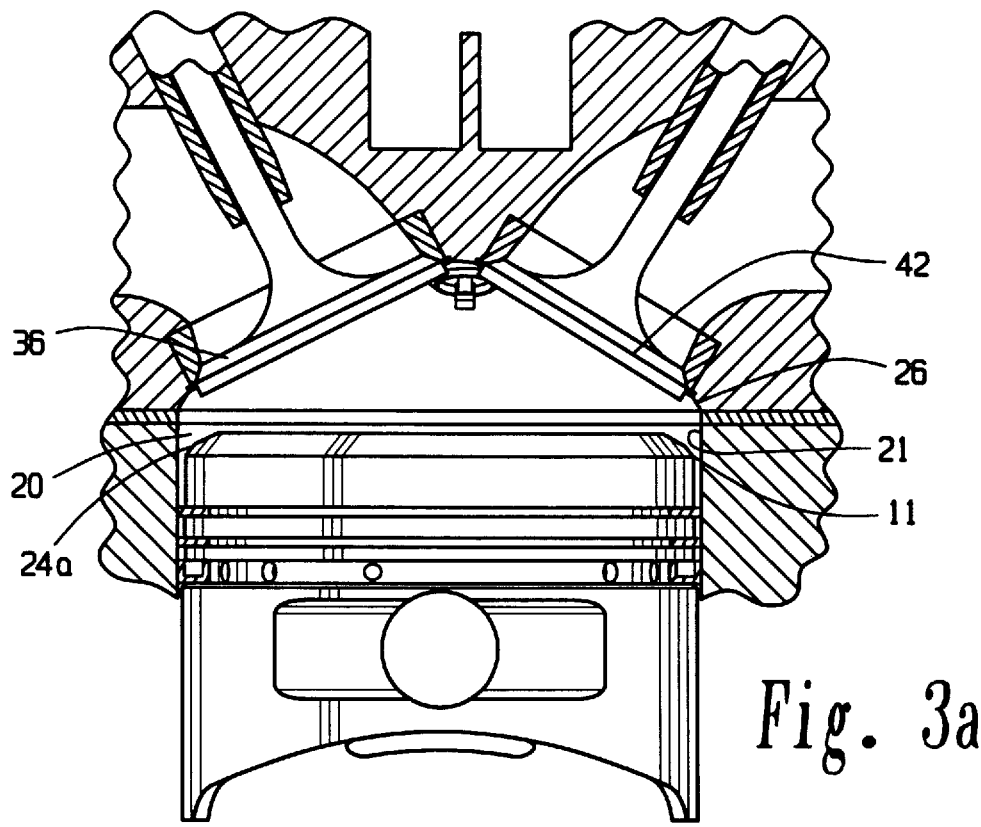
FIG. 3a is a sectional view taking at line 3—3 of FIG. 2 showing a piston near top dead center in a cylinder approaching the spherical cylinder head of the present invention.
Figure 3B:
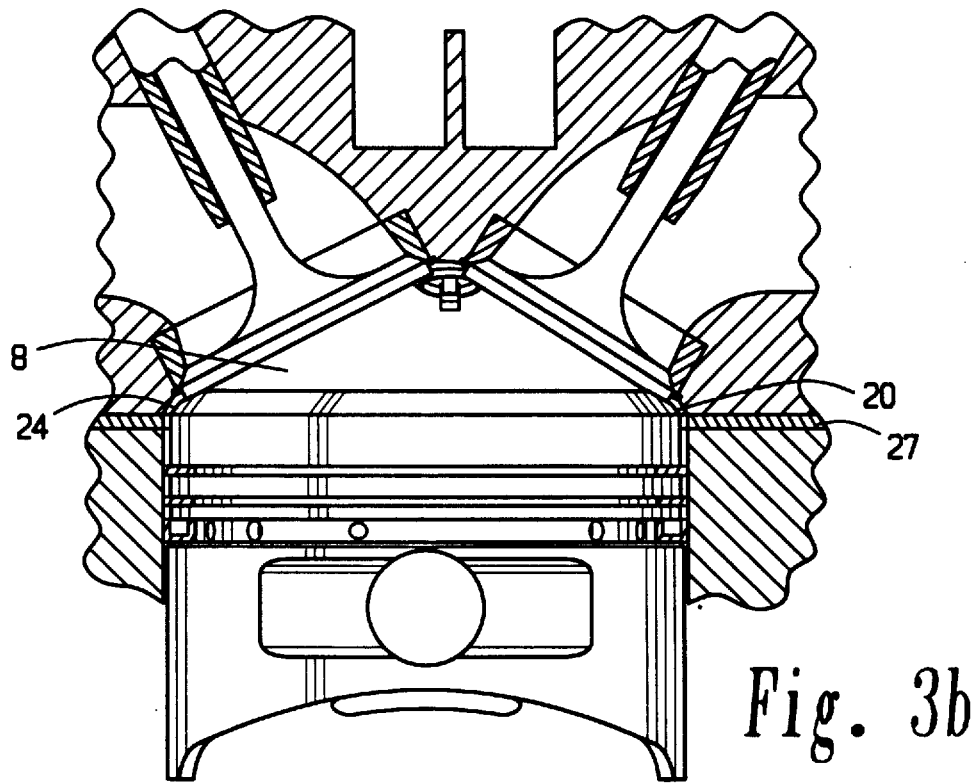
FIG. 3b is a view similar to FIG. 3a, but showing a piston at top dead center.

In accordance with the present invention, the quench area is redefined. Hemi-spherical cylinder head 22 does not overlap the piston cylinder 21 so no conventional ledge is created. The circumferential edge 22 of the head portion 6 is radiused to come within close proximity of the circumferential edge of the hemi-spherical cylinder 26, as shown in FIGS. 3a and 3b. The quench distance or space between the circumferential edge 24 of the head portion 6 and circumferential edge 26 of hemi-spherical cylinder head 22 is approximately the width of head gasket 27, which typically is about 0.060 inches or less as shown in FIG. 3b.

The truncated spherical dome of the head portion 6 is flat, which is required for an uninterrupted flame travel in the combustion chamber which leads to uniform and increased combustion and more horsepower. The dome 10 of the head portion 6 is raised slightly so that at the top dead center position, the circumferential edge 24 of the piston head 6 is on the same plane as the circumferential edge 26 of hemi-spherical cylinder head 22. Piston deck 11 defines the base of dome 10 on head portion 6. The raised portion 24a of circumferential edge 24 is substantially equal to the height of the thickness of gasket 27 which is typically about 0.030 to 0.060 inches.

A unique advantage of the present invention is that since the radius on the piston matches the radius on the head, it creates a large and three dimensional quench area 20 between the cylinder head 22 and head portion 6 consisting of the measurements of the width, height and circumference of the radiused circumferential edge 24 of the head portion 6 of the piston and circumferential edge 26 of the cylinder head 22. Conventional internal combustion engines, for example, using a typical bathtub style chamber with a domed piston have a two dimensional quench area consisting of measurements of the width and circumference of the quench area. If more compression is desired in the conventional chamber, the chamber must be made smaller or a dome must be place on the piston. If the chamber is made smaller, detonation may be reduced and compression increased, however, the smaller chamber hinders flow from the port into the chamber. If the piston is domed, it interferes with flame travel and can cause detonation. The segmented hemi-spherical chamber 8 in cylinder head 22 with a radiused flattop piston of the present invention avoids the problems of conventional internal combustion engines.

Figure 2:
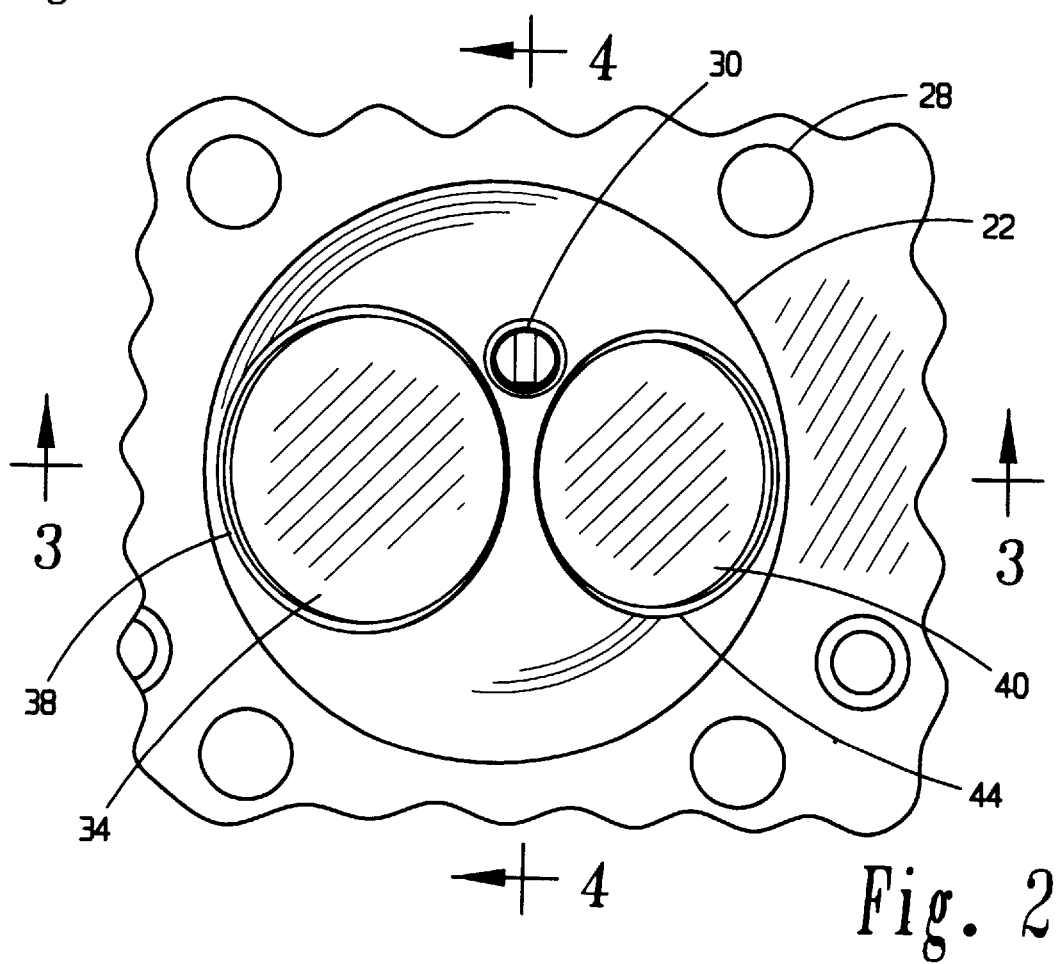
FIG. 2 is a view from the inside of the bottom looking to the top of the hemi-spherical cylinder head of the present invention.

FIG. 2 is a view from the bottom of the cylinder head 22 looking upward showing mounting apertures 28 which are used to mount the cylinder on the engine block. Spark plug aperture 30 is shown for securing a spark plug 32 that provides a spark for ignition in the combustion chamber area 8. Gas and air travel through intake port 34 into the chamber area 8, ignites, combusts and the resulting gases travel around intake valve 36, as shown in FIG. 3a and 3b. The valve is placed at intake seat 38. After combustion, exhaust port 40 is the area where the burned gases and air exit the combustion chamber by movement of exhaust valve 42 which is secured on exhaust seat 44.

FIG. 3a shows head portion 6 before top dead center in cylinder 21 wherein the air gas mixture is brought into the combustion chamber 8 through intake valve 36. FIG. 3b shows a compression stroke where both valves are closed and combustion takes place.

Figure 4A:
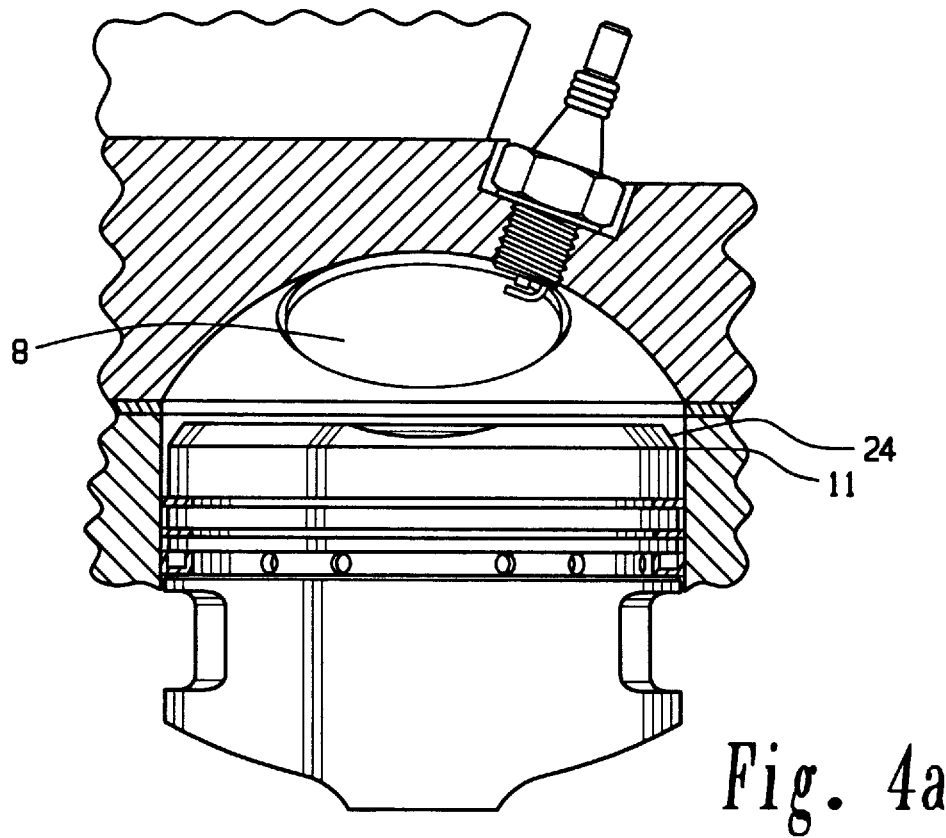
FIG. 4a is a cross-section view of this invention as seen along lines 4—4 of FIG. 2 with the piston near top dead center.
Figure 4B:
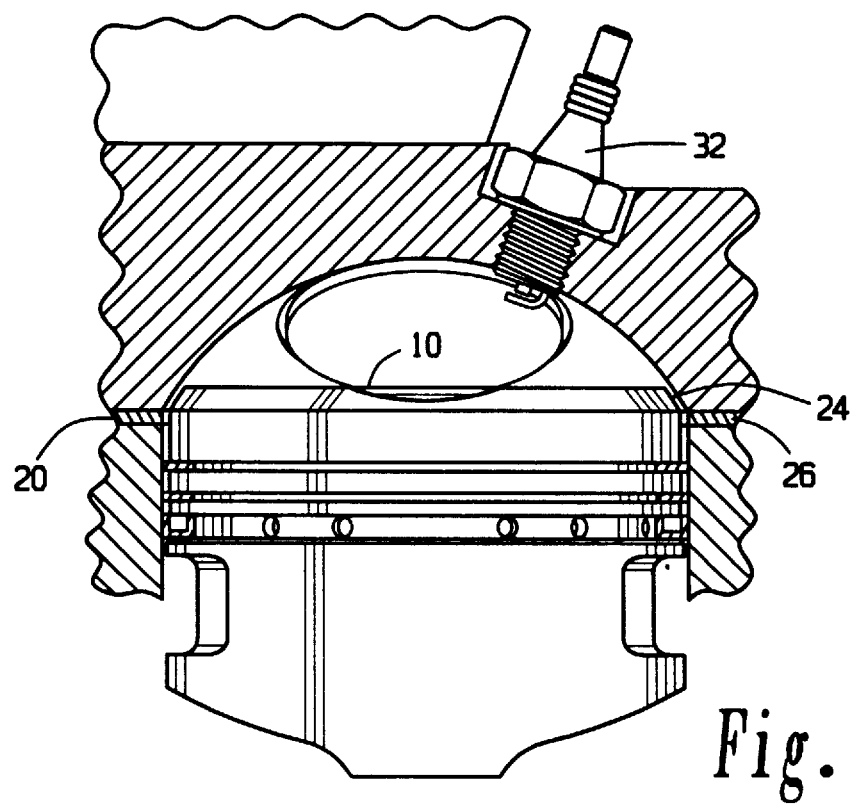
FIG. 4b is a view similar to that of FIG. 4a with the piston at top dead center.

FIGS. 4a and 4b show a similar view with the valves removed wherein the spark plug is in place and ready to ignite the mixture in 4a when head portion 6 is before top dead center and igniting the mixture in FIG. 4b wherein the head portion is at top dead center. Circumferential edge 24 of head portion 6 is shown in FIG. 4b to be in close proximity to circumferential edge 26 of hemi-spherical cylinder head 22 defining the quench area 20, that is, the area around circumferential edge 24 and circumferential edge 26 which allows the uniform mixing of the air and gas mixture to be pushed towards the spark for ignition and uniform burning. The flat deck of head portion 6 allows uninterrupted flame travel across the piston head and throughout the chamber so uniform burning of the fuel gas mixture can take place.

COMPARATIVE TESTING

The following is a comparison of the quench band characteristics of the present invention, a truncated spherical dome piston in a spherical segmented chamber with a conventional piston head and tub cylinder head with a flat quench area with the valve recessed in the tub design. Standard mathematical formulations are utilized.

| | | |
|---|---|---|
| Radius of the dome. | | r = 2.080 in. |
| Height of the flat above the base. | | $h_1$ = .295 in. |
| Diameter of the base, in this case that is the bore of the engine. | | b = 3.5 in. |
| Calculated height of the dome with no flat. | $h_2 = r - \sqrt{\left[r^2 - \left(\frac{b}{2}\right)^2\right]}$ | $h_2$ = 0.956 in |
| Calculated diameter of the flat at the given height. | $f = 2 \cdot \sqrt{[r^2 - [r - (h_2 - h_1)]^2]}$ | f = 3.041 in. |
| Calculated area of the "SQUISH BAND" of the truncated spherical dome piston. | $A_1 = 2 \cdot \pi \cdot r \cdot h_1$ | $A_1$ = 3.855 sq. in. |
| Calculated area of the flat dome top. | $A_2 = \pi \cdot \left(\frac{f}{2}\right)^2$ | $A_2$ = 7.264 sq. in. |
| Combined area of squish and flat top. | $A_3 = A_1 + A_2$ | $A_3$ – 11.119 sq. in. |
| Calculated maximum area of a non domed piston. The squish area and the foot print of the combustion chamber cannot exceed the area of the bore. | $A_4 = \pi \cdot \left(\frac{b}{2}\right)^2$ | $A_4$ = 9.621 sq. in. |
| With a squish band of 25% a non-spherical piston would have the following areas for the squish and chamber foot print. | | $SBP_1$ = .25 |
| Area of squish. | $A_5 = SBP_1 \cdot A_4$ | $A_5$ = 2.405 sq. in. |
| Area of flat. | $A_6 = (1 - SBP_1) \cdot A_4$ | $A_6$ = 7.216 sq. in. |

As shown in the comparison, the squish band or quench area of the present invention shown at $A_1$ is greater than the squish band or quench area of the conventional piston cylinder head at $A_5$. Further, the quench area is greater with a flat dome piston and hemi-spherical cylinder of the present invention showing $A_2$ than with the conventional piston at the same diameter. This increase in performance is due primarily to the three dimensional area, that is, the height, width and circumference of circumferential edge of the piston of the present invention which define the squish or quench area whereas conventional devices have a two dimensional quench area, that is, the width and circumference, of the piston top.

Dynamometer Test 1

The dynamometer is an apparatus that measures horsepower and is manufactured by the Dynojet Manufacturing Company. The rear wheel of a motorcycle is placed on a roller, with the frame secured. Sensors are connected to various parts of the motorcycle to monitor the engine RPM and wheel revolutions in order are monitored, to calculate the horsepower in a conventional manner.

The first test is for a stock motorcycle that provides a frame of reference for the dynamometer. Table 1 shows the horsepower ratings for a stock motorcycle placed on the dynamometer. The motorcycle is a Harley Davidson 1994 Nostalgia. Note at 4500 RPM, the corrected horsepower is 47.6.

Dynamometer Test 2

On the same dynamometer, the stock motorcycle was again evaluated for horsepower, however, the present invention was installed in the block. No other components were added to the engine, exhaust or frame. Table 2 shows the increased horsepower. At 4500 RPM, the horsepower is 53.6 which is about a 12.6% increase over the stock motorcycle without the present invention.

Dynamometer Test 3

Increase in horsepower is shown when an improved carburetor and cam shaft are installed in the engine. The exhaust system is modified with baffled mufflers. In this run, a modified Harley Davidson Big Twin was installed on the dynamometer, and as seen in Table 3, at 5500 RPM, 81.5 horsepower was obtained, which is a significant increase over the stock engine.

TABLE 2

Dynojet Model 100 Chassis Dynamometer Test Data
Test name/title: DYNORUN.005 5TH 94 NASTALGIA 1340 H-D HEADS, –3 TIM
Acceleration from 2000 to 6000 RPM, interval = 250
Absolute barometric pressure: 29.16 in. Hg.
Vapor pressure: 0.31 in. Hg.
Room air temperature: 61.8 deg. F.
Gear Ratio: 43 RPM/MPH
Correction Factor: 1.00 SAE net

| | Measured | | Corrected | |
|---|---|---|---|---|
| Engine RPM | T ft-lb | P hp | T ft-lb | P hp |
| 2000 | RPM Data Not Available | | | |
| 2250 | 60.6 | 25.9 | 60.4 | 25.9 |
| 2500 | 66.3 | 31.5 | 66.2 | 31.5 |
| 2750 | 71.4 | 37.4 | 71.2 | 37.3 |
| 3000 | 71.7 | 40.9 | 71.6 | 40.9 |
| 3250 | 71.1 | 44.0 | 71.0 | 43.9 |
| 3500 | 71.5 | 47.6 | 71.4 | 47.6 |
| 3750 | 69.9 | 49.9 | 69.8 | 49.8 |
| 4000 | 68.0 | 51.8 | 67.9 | 51.7 |
| 4250 | 66.0 | 53.4 | 65.9 | 53.3 |
| 4500 | 62.7 | 53.7 | 62.6 | 53.6 |
| 4750 | 59.0 | 53.4 | 58.9 | 53.3 |

TABLE 2-continued

| | | | | |
|---|---|---|---|---|
| 5000 | 54.2 | 51.6 | 54.1 | 51.5 |
| 5250 | 40.3 | 40.3 | 40.3 | 40.3 |

TABLE 1

Dynojet Model 100 Chassis Dynamometer Test Data
Test name/title: DYNORUN.001
Test date and time: 3/29/95 03:27 pm
Acceleration from 2000 to 6000 RPM, interval = 25–
Absolute barometric pressure:  28.71 in. Hg.
Vapor pressure:  0.38 in. Hg.
Room air temperature:  64.7 deg. F.
Gear Ratio:  53 RPM/MPH
Correction Factor:  1.02 SAE net

| | Measured | | Corrected | |
|---|---|---|---|---|
| Engine RPM | T ft-lb | P hp | T ft-lb | P hp |
| 2000 | RPM Data Not Available | | | |
| 2250 | 28.0 | 12.0 | 28.7 | 12.3 |
| 2500 | 56.1 | 26.7 | 57.5 | 27.4 |
| 2750 | 62.0 | 32.5 | 63.5 | 33.2 |
| 3000 | 63.4 | 36.2 | 64.9 | 37.1 |
| 3250 | 62.7 | 38.8 | 64.2 | 39.7 |
| 3500 | 61.9 | 41.2 | 63.3 | 42.2 |
| 3750 | 60.6 | 43.3 | 62.0 | 44.3 |
| 4000 | 58.9 | 44.8 | 60.3 | 45.9 |
| 4250 | 56.8 | 46.0 | 58.1 | 47.0 |
| 4500 | 54.3 | 46.5 | 55.5 | 47.6 |
| 4750 | 50.9 | 46.0 | 52.1 | 47.1 |
| 5000 | 47.7 | 45.4 | 48.8 | 46.4 |
| 5250 | 39/1 | 38.1 | 39.0 | 39.0 |

TABLE 3

Dynojet Model 100 Chassis Dynamometer Test Data
Test name/title: HEMI DESIGN 80" BIG TWIN Run #5
10 to 1 Comp.-HS 42R carb - Andrews EV 72 cam - Baffled mufflers
Acceleration from 3000 to 6000 RPM, interval = 250
Absolute barometric pressure:  29.16 in. Hg.
Vapor pressure:  0.80 in. Hg.
Room air temperature:  85.7 deg. F.
Gear Ratio:  46 RPM/MPH
Correction Factor:  1.05 SAE net

| | Measured | | Corrected | |
|---|---|---|---|---|
| Engine RPM | T ft-lb | P hp | T ft-lb | P hp |
| 3000 | 69.8 | 40.0 | 73.1 | 41.7 |
| 3250 | 70.1 | 43.4 | 73.4 | 45.4 |
| 3500 | 71.1 | 47.4 | 74.4 | 49.6 |
| 3750 | 72.9 | 52.1 | 76.3 | 54.5 |
| 4000 | 74.4 | 56.7 | 77.9 | 59.3 |
| 4250 | 76.8 | 62.1 | 80.4 | 65.1 |
| 4500 | 77.2 | 66.1 | 80.8 | 69.3 |
| 4750 | 76.8 | 69.5 | 80.4 | 72.7 |
| 5000 | 75.4 | 71.8 | 78.9 | 75.2 |
| 5250 | 75.2 | 75.2 | 78.7 | 78.7 |
| 5500 | 74.4 | 77.9 | 77.9 | 81.5 |
| 5750 | 68.4 | 74.9 | 71.6 | 78.4 |
| 6000 | 64.4 | 73.6 | 67.4 | 77.0 |

The present invention shows improved results with a myriad of different engine displacements with any desired compression ratio from 7 to 17 to 1 and still have the necessary quench area to insure a clean running, horsepower producing engine that is not prone to detonation even under severe conditions.

While in accordance with the provisions of the patent statutes, the preferred forms and embodiments of the invention have been illustrated and described, it will become apparent to those skilled in the art that there are changes and modifications may be made without deviating from the inventive concept set forth above.

What is claimed is:

1. In an internal combustion engine comprising at least one hemi-spherical cylinder head defining a combustion chamber having an intake opening for introduction of an air-fuel mixture to the chamber and an exhaust opening for removal of exhaust gases from the chamber, valve means for opening and closing the intake and exhaust openings, and a generally cylindrical piston which reciprocates along its longitudinal axis relative to the chamber, the improvement which comprises:

a circular flat piston head portion extending normal to the piston axis and having opposed depressions opposite the chamber intake and exhaust openings, respectively, said circular flat head portion including a beveled rim with a radiused profile, said circular flat piston head having a circular edge and the cylinder head having a circular circumferential edge which matches the circular edge of the piston which define a uniform quench area upon the compression stroke of the piston.

2. The apparatus as defined in claim 1 wherein the depressions on the surface of the flat piston head are valve pockets.

3. The apparatus as defined in claim 1 wherein the flat piston head portion is elevated from a piston deck in an amount equal to the height of the thickness of the head gasket.

4. The apparatus as defined in claim 1 wherein the circular edge of the piston head portion is at the same plane of the circular circumferential edge of the cylinder head when the piston is at top dead center.

5. The apparatus as defined in claim 1 wherein the circular edge of the piston head portion has a three dimensional quench area which is obtained by defining the width, height and circumference of the radius of the circular edge of the head portion of the piston.

6. The apparatus as defined in claim 1 wherein the piston head portion has a flat dome allowing uninterrupted flame travel across the dome.

7. The apparatus as defined in claim wherein the circular edge of the head portion of the piston and the circular circumferential edge of the cylinder head are in close proximity to each other when the piston head portion is at top dead center.

8. The apparatus as defined in claim 1 wherein the circular edge of the piston head and the circular circumferential edge of the cylinder head are in close proximity to each other during the combustion stroke of the piston so that a squish is created which increases the turbulence in the combustion chamber for a more efficient combustion of the air-gas mixture.

* * * * *